US012674759B2

(12) United States Patent
Senga et al.

(10) Patent No.: US 12,674,759 B2
(45) Date of Patent: Jul. 7, 2026

(54) PROCESSING APPARATUS, PROCESSING SYSTEM, PROCESSING METHOD, AND STORAGE MEDIUM

(71) Applicant: CANON KABUSHIKI KAISHA, Tokyo (JP)

(72) Inventors: Emi Senga, Tokyo (JP); Yuma Kudo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 287 days.

(21) Appl. No.: 18/647,319

(22) Filed: Apr. 26, 2024

(65) Prior Publication Data

US 2024/0402086 A1      Dec. 5, 2024

(30) Foreign Application Priority Data

May 29, 2023      (JP) ................................ 2023-088072

(51) Int. Cl.
| | |
|---|---|
| *G01N 21/64* | (2006.01) |
| *G01N 21/25* | (2006.01) |
| *H04N 23/71* | (2023.01) |
| *H04N 23/74* | (2023.01) |
| *G01N 21/17* | (2006.01) |

(52) U.S. Cl.
CPC ....... *G01N 21/6456* (2013.01); *G01N 21/255* (2013.01); *H04N 23/71* (2023.01); *H04N 23/74* (2023.01); *G01N 2021/1776* (2013.01); *G01N 2201/1245* (2013.01)

(58) Field of Classification Search
CPC ......... G01N 2021/1776; G01N 21/255; G01N 21/6456; G01N 2201/1245; H04N 23/71; H04N 23/74
See application file for complete search history.

(56) References Cited

U.S. PATENT DOCUMENTS

| | | | |
|---|---|---|---|
| 10,805,553 B2 | 10/2020 | Kudo | |
| 2010/0245550 A1* | 9/2010 | Ishihara | ........... A61B 1/000095 |
| | | | 348/E7.085 |
| 2018/0302571 A1 | 10/2018 | Kudo | |
| 2023/0255460 A1* | 8/2023 | Kojima | ................. A61B 1/043 |

FOREIGN PATENT DOCUMENTS

JP            2018-182741  A      11/2018

* cited by examiner

*Primary Examiner* — Mark R Gaworecki
(74) *Attorney, Agent, or Firm* — Venable LLP

(57)            ABSTRACT

A processing apparatus includes: a first obtaining unit configured to obtain first image information relating to brightness adjustment of a first image obtained from light including light of a first light source and light of a second light source different from the first light source; a second obtaining unit configured to obtain second image information relating to brightness adjustment of a second image obtained from light of the second light source; and a control unit configured to control each of intensity of a first irradiation light emitted by the first light source and sensitivity of the first image and intensity of a second irradiation light emitted by the second light source and sensitivity of the second image.

19 Claims, 5 Drawing Sheets

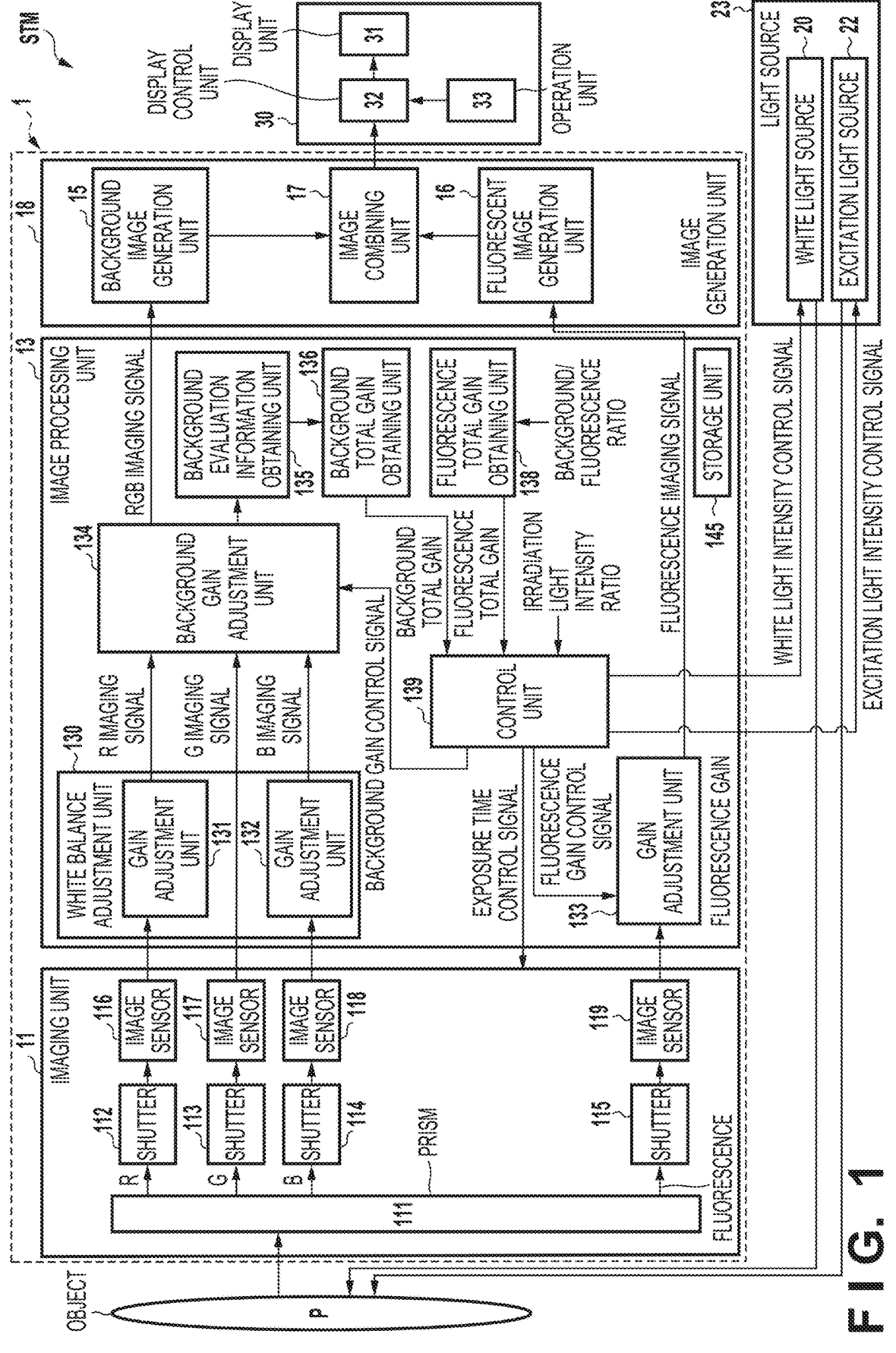
F I G. 1

FIG. 2

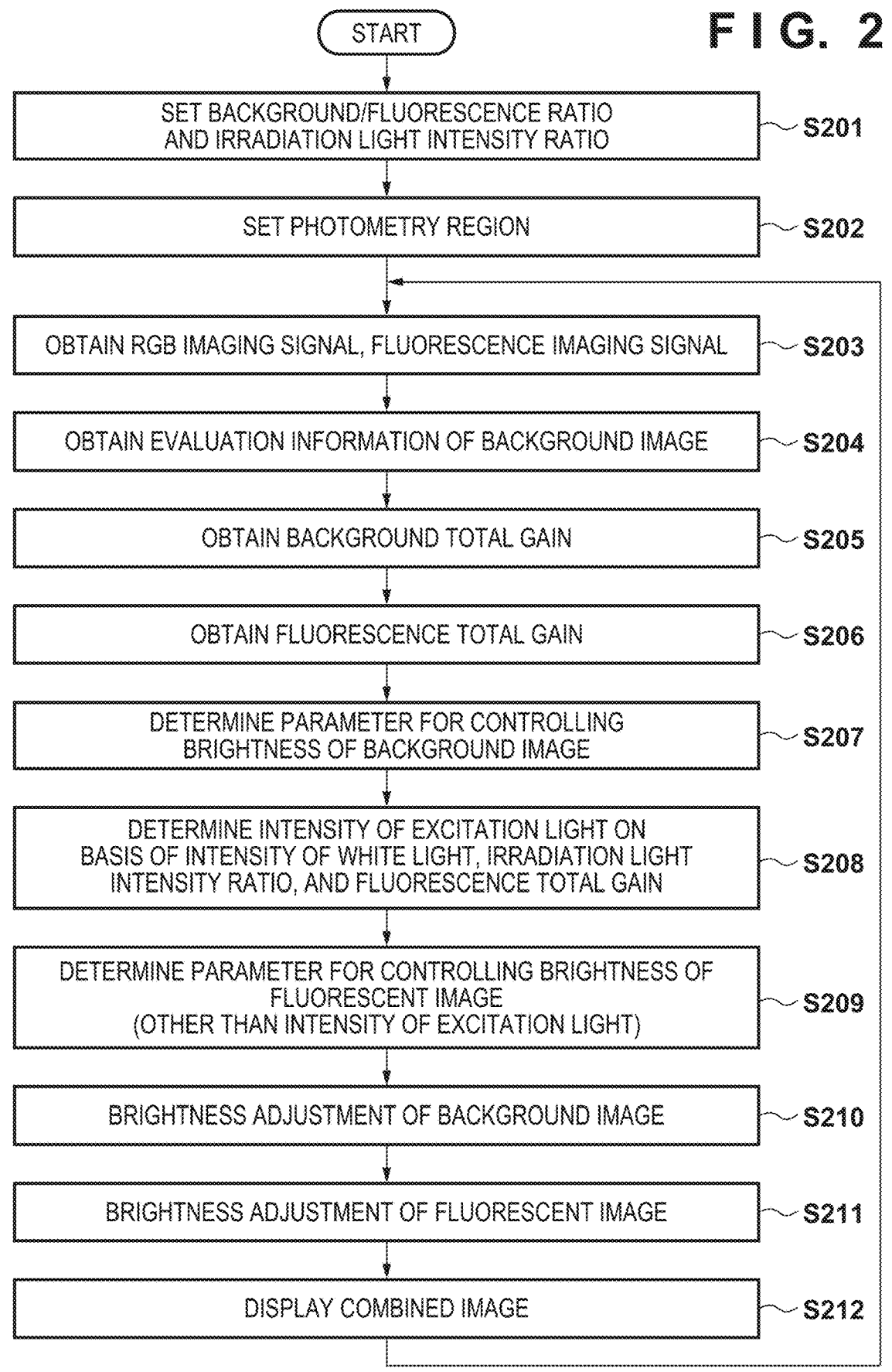

START

SET BACKGROUND/FLUORESCENCE RATIO
AND IRRADIATION LIGHT INTENSITY RATIO — S201

SET PHOTOMETRY REGION — S202

OBTAIN RGB IMAGING SIGNAL, FLUORESCENCE IMAGING SIGNAL — S203

OBTAIN EVALUATION INFORMATION OF BACKGROUND IMAGE — S204

OBTAIN BACKGROUND TOTAL GAIN — S205

OBTAIN FLUORESCENCE TOTAL GAIN — S206

DETERMINE PARAMETER FOR CONTROLLING
BRIGHTNESS OF BACKGROUND IMAGE — S207

DETERMINE INTENSITY OF EXCITATION LIGHT ON
BASIS OF INTENSITY OF WHITE LIGHT, IRRADIATION LIGHT
INTENSITY RATIO, AND FLUORESCENCE TOTAL GAIN — S208

DETERMINE PARAMETER FOR CONTROLLING BRIGHTNESS OF
FLUORESCENT IMAGE
(OTHER THAN INTENSITY OF EXCITATION LIGHT) — S209

BRIGHTNESS ADJUSTMENT OF BACKGROUND IMAGE — S210

BRIGHTNESS ADJUSTMENT OF FLUORESCENT IMAGE — S211

DISPLAY COMBINED IMAGE — S212

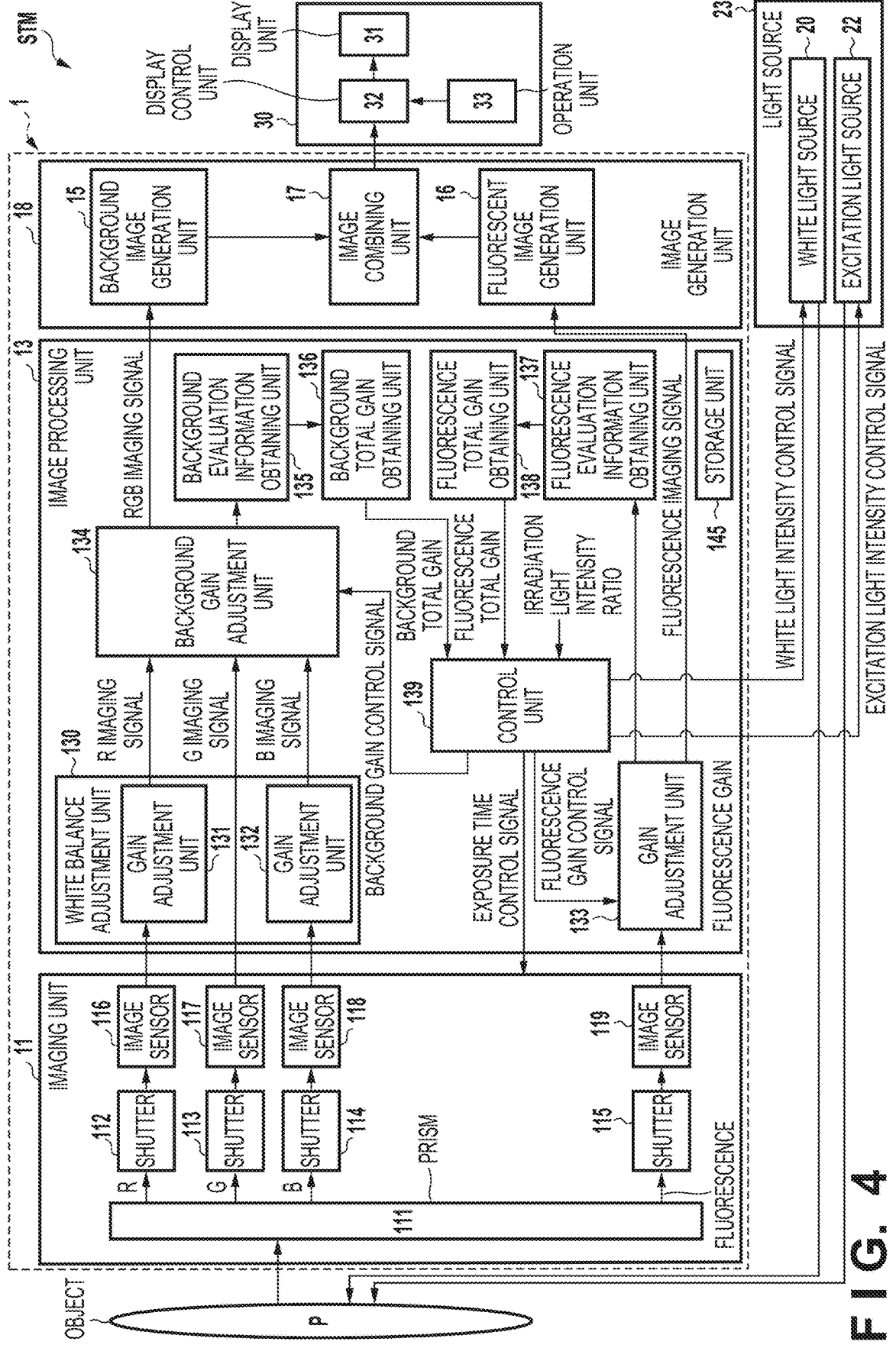
F I G. 4

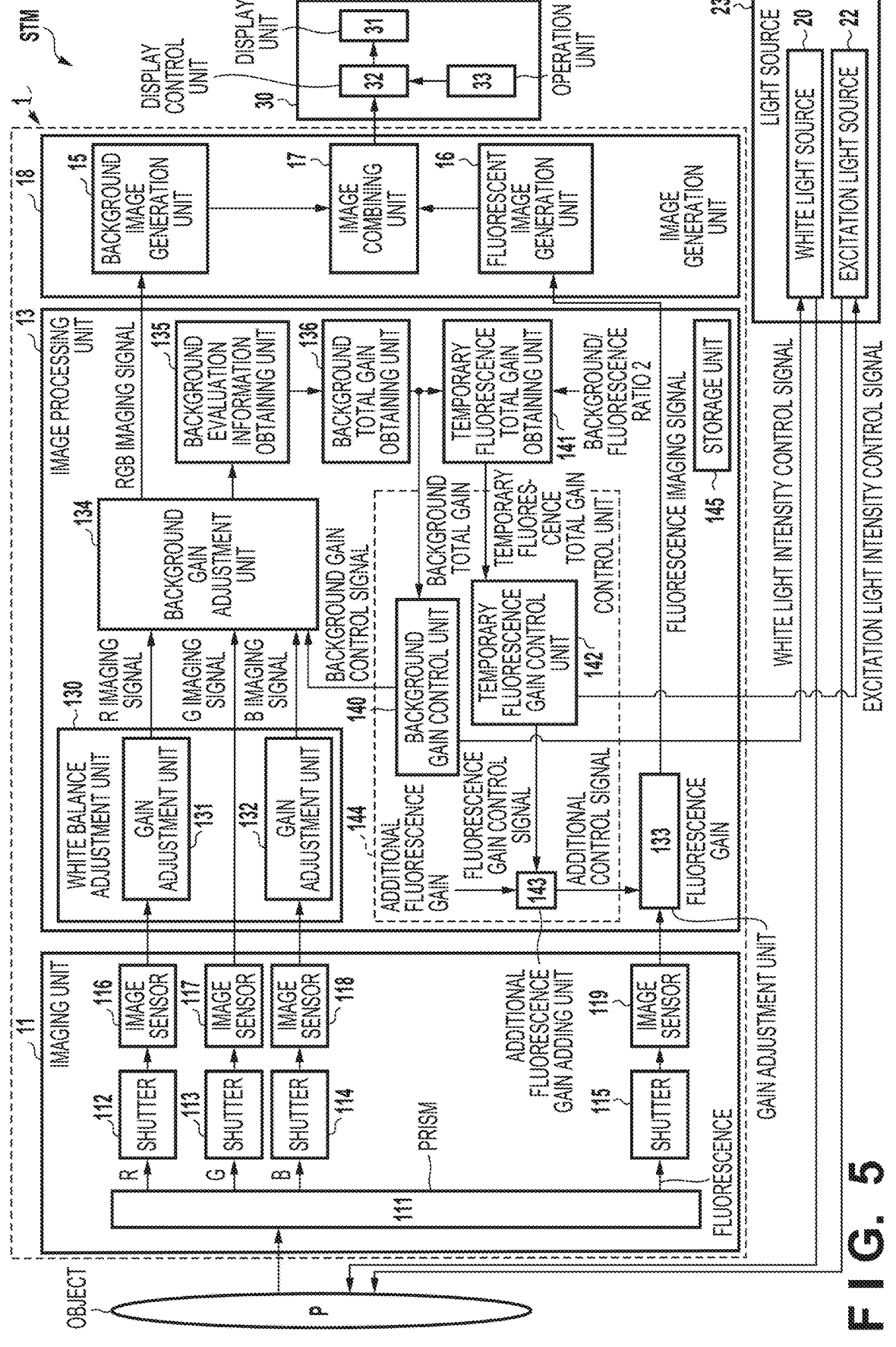
F I G. 5

PROCESSING APPARATUS, PROCESSING SYSTEM, PROCESSING METHOD, AND STORAGE MEDIUM

BACKGROUND OF THE INVENTION

Field of the Invention

The techniques of the disclosure relate to a processing apparatus, a processing system, a processing method, and a storage medium.

Description of the Related Art

In a processing used when observing (normal observation) an object using a white light source that generates visible light, light intensity, exposure time, gain applied to an electrical signal generated by receiving light, and the like are automatically controlled and a constant brightness is maintained for an image obtained via the normal observation. A similar brightness automatic control may be used when observing fluorescence (fluorescence observation) produced by emitting X-rays, ultraviolet light, infrared light, or visible light as an excitation light.

However, for example, in medical fields, when using fluorescence observation as described above, an image (fluorescent image) obtained by fluorescence observation may be superimposed on an image (background image) obtained by normal observation and observed.

Japanese Patent Laid-Open No. 2018-182741 describes a method for controlling the brightness in fluorescence observation that includes automatically adjusting the brightness of a fluorescent image according to a control parameter determined from a background image.

In the technique of Japanese Patent Laid-Open No. 2018-182741, as brightness control information, control methods using light intensity, exposure time (shutter), and gain as control parameters are noted, but there are not restrictions on the priority of each control method. For example, if gain is increased, the noise component is increased and image quality is reduced. Thus, typically, when increasing the brightness of an image, a control method using a control parameter other than gain is prioritized. With a fluorescent image, if a sufficient brightness cannot be obtained despite increasing the excitation light intensity, the brightness may be adjusted by increasing the gain. Also, when decreasing the brightness of an image with increased gain, typically, the gain is decreased.

However, with a fluorescent image and a background image, when adjusting the brightness using different control methods, the white balance of the background image may be skewed. In a case where reflected light of the excitation light is mixed in the background image, by adjusting the brightness in the fluorescent image via the gain without changing the excitation light intensity and adjusting the brightness in the background image via the white light (visible light) intensity of the light source, the white balance of the background image is skewed. For example, in a case where the reflected light of the excitation light is a blue color, by decreasing the intensity of the white light without changing the intensity of the excitation light, the background image takes on a relatively blue color.

The techniques of the disclosure have been made in consideration of the aforementioned known techniques and provide techniques for automatically adjusting brightness while suppressing variation in the white balance of a background image in a case where the reflected light of excitation light is mixed in the background image.

SUMMARY OF THE INVENTION

According to one aspect of the present invention, there is provided a processing apparatus comprising: a first obtaining unit configured to obtain first image information relating to brightness adjustment of a first image obtained from light including light of a first light source and light of a second light source different from the first light source; a second obtaining unit configured to obtain second image information relating to brightness adjustment of a second image obtained from light of the second light source; and a control unit configured to control each of intensity of a first irradiation light emitted by the first light source and sensitivity of the first image and intensity of a second irradiation light emitted by the second light source and sensitivity of the second image, wherein the control unit controls at least one of the intensity of the first irradiation light emitted by the first light source, the sensitivity of the first image, the intensity of the second irradiation light emitted by the second light source, and the sensitivity of the second image on a basis of the first image information and the second image information so that a ratio between the intensity of the first irradiation light and the intensity of the second irradiation light is within a predetermined range.

BRIEF DESCRIPTION OF THE DRAWINGS

FIG. 1 is a block diagram illustrating the configuration of an imaging apparatus according to a first embodiment.

FIG. 2 is a flowchart illustrating a brightness adjustment processing of the imaging apparatus according to the first embodiment.

FIG. 4 is a block diagram illustrating the configuration of an imaging apparatus according to a second embodiment.

FIG. 5 is a block diagram illustrating the configuration of an imaging apparatus according to a third embodiment.

DESCRIPTION OF THE EMBODIMENTS

Figure 3:
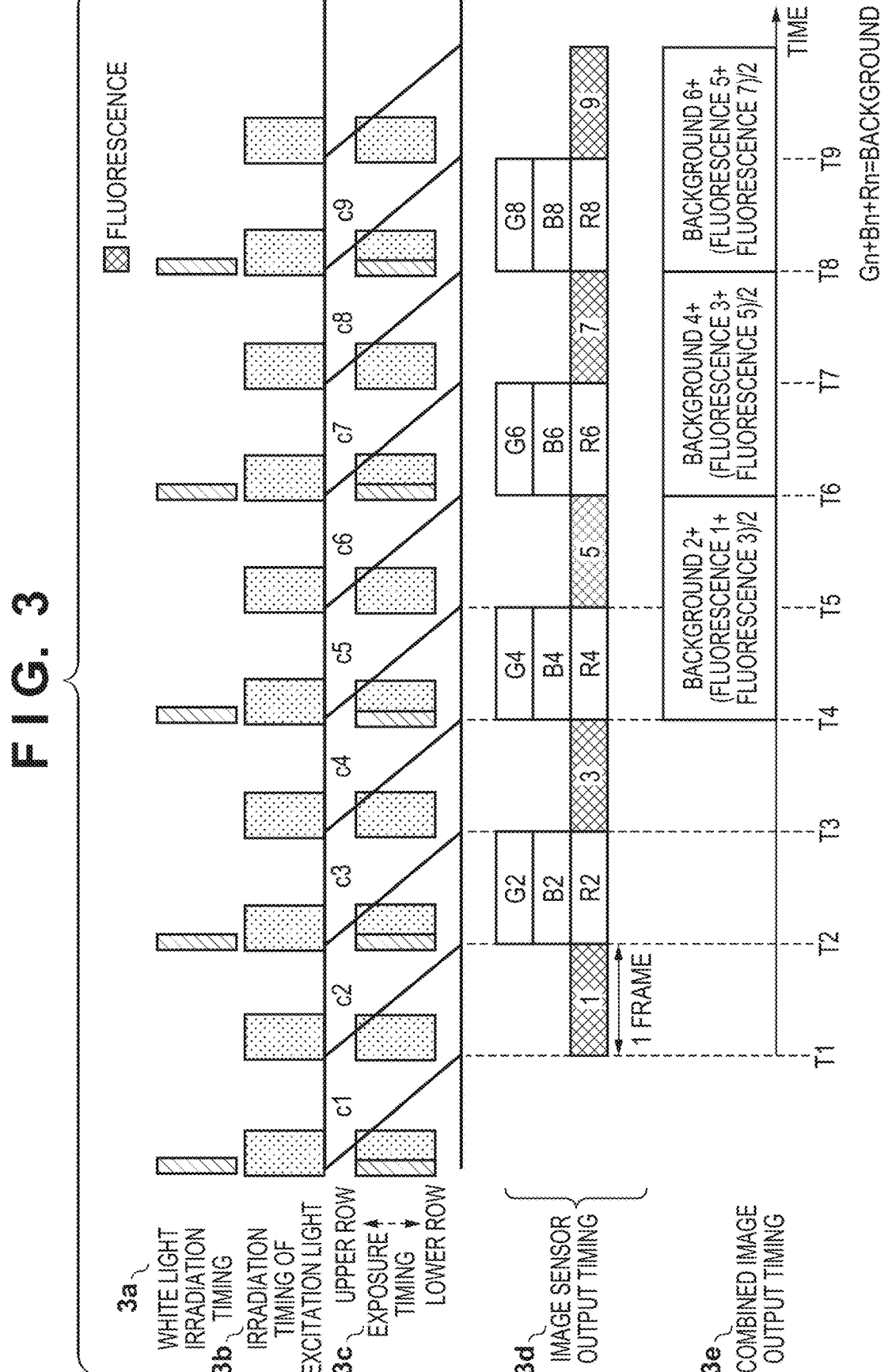
FIG. 3 is a diagram illustrating an example of time-division control of the imaging apparatus according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

An imaging apparatus according to the first embodiment will be described with reference to the block diagram of FIG. 1. An imaging apparatus 1 according to the first embodiment includes an imaging unit 11, an image processing unit 13, and an image generation unit 18. Hereinafter, the imaging apparatus 1 is also referred to as a processing apparatus. Also, a processing system STM includes the imaging apparatus 1 (processing apparatus), a light source 23, and a display apparatus 30.

The imaging unit 11 includes a prism 111, shutters 112, 113, 114, and 115, and image sensors 116, 117, 118, and 119.

The image processing unit 13 includes gain adjustment units 131, 132, and 133, a background gain adjustment unit 134 (first image gain adjustment unit), a background evaluation information obtaining unit 135, a background total gain obtaining unit 136 (first obtaining unit), a fluorescence total gain obtaining unit 138 (second obtaining unit), and a control unit 139. Herein, "gain" refers to the amplification amount of an electrical signal (imaging signal).

The image generation unit 18 includes a background image generation unit 15, a fluorescent image generation unit 16, and an image combining unit 17.

Also, the light source 23 includes a white light source 20 (first light source) and an excitation light source 22 (second light source) with light intensity that can be adjusted on the basis of a control signal output from the imaging apparatus 1 (processing apparatus). The white light source 20 (first light source) is a light source for observing reflected light from an object P. The white light source 20 outputs white light with a visible light including a mix of light beams of each wavelength. The white light output from the white light source 20 is emitted toward the object P. The white light emitted toward the object P is reflected, generating reflected light.

The control unit 139 of the image processing unit 13 can control the intensity of the white light output from the white light source 20 on the basis of a white light intensity control signal. The white light intensity can be adjusted by adjusting the amount of time the white light is on, for example.

When the control unit 139 controls the white light source 20 (first light source), the intensity of a first irradiation light emitted from the white light source 20 (first light source) can be controlled using at least one of the amplitude of the first irradiation light, the amount of time the first irradiation light is on, the pulse width of the first irradiation light, and the pulse density of the first irradiation light.

The excitation light source 22 (second light source) is a light source for observing fluorescence emitted from a fluorescent material in the object P. The excitation light source 22 outputs a blue excitation light, for example. The excitation light output from the excitation light source 22 is emitted toward the object P. Herein, it is assumed that a fluorescent material that is excited by blue excitation light is in the object P, and the fluorescence emitted from the fluorescent material is a red color. Note that the wavelength of the excitation light and the fluorescence is not limited, and the excitation light source 22 may be a green excitation light and the fluorescence may be infrared, for example.

The control unit 139 can control the intensity of the excitation light output by the excitation light source 22 on the basis of an excitation light intensity control signal. When the control unit 139 controls the excitation light source 22 (second light source), the intensity of a second irradiation light emitted from the excitation light source 22 (second light source) can be controlled using at least one of the amplitude of the second irradiation light, the amount of time the second irradiation light is on, the pulse width of the second irradiation light, and the pulse density of the second irradiation light.

Configuration of Imaging Unit 11

The imaging unit 11 captures a first image and a second image. Hereinafter, the first image may also be referred to as the background image, and the second image may be referred to as the fluorescent image. The first image (background image) is an image obtained from light including the light of the white light source 20 (first light source) and the light of the excitation light source 22 (second light source) different from the white light source 20. In other words, the first image is an image in which the light of the excitation light source 22 (second light source) is mixed in with the light of the white light source 20 (first light source). Also, the second image (fluorescent image) is an image obtained from the light of the excitation light source 22 (second light source).

The prism 111 is a dichroic prism, for example, and the prism 111 splits (separates) the reflected light from the object P and the fluorescence into light of the three primary colors, red light, green light, and blue light. Hereinafter, red light may be referred to as R (red) light, green light may be referred to as G (green) light, and blue light may be referred to as B (blue) light. Note that red fluorescence is split into the same path as the R (red) light of the reflected light. Thus, in practice, the shutter 112 and the image sensor 116 are commonly used and they are distributed into R (red) light of the reflected light and red fluorescence by time-division control. For the sake of convenience, the drawings virtually illustrate the R (red) light and the red fluorescence being processed in separate paths.

In other words, the light receiving paths are virtually split in the description such that in a time period in which reflected light for the background image is received, the R (red) light passes through the shutter 112 and is received at the image sensor 116. Also, in a period in which red fluorescence for the fluorescent image is received, the fluorescence passes through the shutter 115 and is received at the image sensor 119. Note that an example of the time-division control will be described below with reference to FIG. 3.

The shutter 112 adjusts the incident light amount (hereinafter, referred to as exposure time) when the R (red) light split at the prism 111 is incident on the following image sensor 116. The shutter 113 adjusts the exposure time when the G (green) light split at the prism 111 is incident on the following image sensor 117. The shutter 114 adjusts the exposure time when the B (blue) light split at the prism 111 is incident on the following image sensor 118.

Also, the shutter 115 adjusts the exposure time when the red fluorescence split at the prism 111 is incident on the following image sensor 119.

Note that the detailed operation of each shutter in a case where each shutter has a mechanical shutter configuration includes physically opening and closing to adjust the amount of incident light on the image sensor. In other words, "exposure time" in the case of mechanical shutters refers to the amount of time that the image sensor receives light.

In a case where each shutter has an electronic shutter configuration, the amount of incident light on the image sensor is adjusted by adjusting the charge amount of the charge from the empty state of a capacitor. In other words, "exposure time" in the case of electronic shutters refers to the recharge time after the charge is lost.

The image sensor 116 performs photoelectric conversion on the R (red) light and generates an R imaging signal, which is an electrical signal. The image sensor 117 performs photoelectric conversion on the G (green) light and generates a G imaging signal, which is an electrical signal. The image sensor 118 performs photoelectric conversion on the B (blue) light and generates a B imaging signal, which is an electrical signal. Hereinafter, the R imaging signal, the G imaging signal, and the B imaging signal may also be collectively referred to as an RGB imaging signal, which is an electrical signal obtained by receiving light for the background image.

The image sensor 119 performs photoelectric conversion on the fluorescence and generates a fluorescence imaging signal, which is an electrical signal.

The image sensors described above are assumed to each be a complementary metal oxide semiconductor (CMOS) for example, but a charge coupled device (CCD) or another type of image sensor may also be used.

Configuration of Image Processing Unit 13

Gain Adjustment Unit 131 and Gain Adjustment Unit 132

The gain adjustment unit 131 obtains the R imaging signal from the image sensor 116 and adjusts the gain of the R imaging signal. Also, the gain adjustment unit 131 outputs the R imaging signal with adjusted gain to the background gain adjustment unit 134. Also, the gain adjustment unit 132 obtains the B imaging signal from the image sensor 118 and adjusts the gain of the B imaging signal. Also, the gain adjustment unit 132 outputs the B imaging signal with adjusted gain to the background gain adjustment unit 134.

The gain adjustment by the gain adjustment unit 131 and the gain adjustment unit 132 is white balance adjustment, and the gain adjustment unit 131 and the gain adjustment unit 132 function as a white balance adjustment unit 130 (hereinafter also referred to as simply an adjustment unit). The gain adjustment unit 131 and the gain adjustment unit 132 adjust the gain by adjusting the amplitude of the R imaging signal and the B imaging signal as necessary via typical processing. The white balance adjustment unit 130 adjusts the white balance of the plurality of imaging signals (R imaging signal, G imaging signal, B imaging signal) obtained by the imaging unit 11 on the basis of the light split from the light of the white light source 20 (first light source).

The gain adjustment unit 133 (second image gain adjustment unit) adjusts the gain of the imaging signal (fluorescence imaging signal) obtained by the imaging unit 11 on the basis of the light of the excitation light source 22 (second light source). The gain adjustment unit 133 (second image gain adjustment unit) obtains the fluorescence imaging signal from the image sensor 119. Also, the gain adjustment unit 133 obtains a control signal relating to the gain adjustment of the fluorescence imaging signal from the control unit 139 described below. Also, the gain adjustment unit 133 adjusts the gain (hereinafter also referred to as fluorescence gain) of the fluorescence imaging signal on the basis of the control signal relating to gain adjustment. The gain adjustment unit 133 outputs the fluorescence imaging signal with adjusted gain to the fluorescent image generation unit 16.

The control unit 139 controls the intensity of the first irradiation light emitted by the white light source 20 (first light source) and the background total gain (first image information) and the intensity of the second irradiation light emitted by the excitation light source 22 (second light source) and the fluorescence total gain (second image information).

So that the ratio between the first irradiation light intensity and the second irradiation light intensity is within a predetermined range, the control unit 139 controls at least one of the intensity of the first irradiation light emitted by the first light source, the first image information of the first image, the intensity of the second irradiation light emitted by the second light source, and the second image information of the second image.

The control unit 139 adjusts the background total gain (first image information) and the fluorescence total gain (second image information) using at least one of the exposure time of the imaging unit 11 that generates an electrical signal by receiving light, the gain applied to the electrical signal generated by the imaging unit 11, and the gain applied to the electrical signal used for generating an image (first image, second image) by the image generation unit 18.

When controlling the ratio between the first irradiation light intensity and the second irradiation light intensity to be a predetermined intensity ratio, if the intensity of the first irradiation light is at the maximum, the control unit 139 controls the intensity of the second irradiation light to be the maximum, within the adjustment range of the white light source 20 (first light source) and the adjustment range of the excitation light source 22 (second light source).

Also, the control unit 139 controls the intensity of the first irradiation light to not exceed the adjustment range of the intensity of the second irradiation light on the basis of the set irradiation light intensity ratio and the adjustment range of the first light source and the adjustment range of the second light source.

Also, when the control unit 139 controls the intensity of the first irradiation light, the control unit 139 prioritizes controlling the intensity of the second irradiation light over the sensitivity of the second image, and when the control unit 139 controls the sensitivity of the first image, the control unit 139 prioritizes controlling the sensitivity of the second image over the intensity of the second irradiation light. Also, when the control unit 139 controls the intensity of the second irradiation light, the control unit 139 prioritizes controlling the intensity of the first irradiation light over the sensitivity of the first image, and when the control unit 139 controls the sensitivity of the second image, the control unit 139 prioritizes controlling the sensitivity of the first image over the intensity of the first irradiation light.

Background Gain Adjustment Unit 134

The background gain adjustment unit 134 (first image gain adjustment unit) adjusts the gain of the plurality of control signals for the first image using the plurality of imaging signals (R imaging signal, G imaging signal, and B imaging signal) with adjusted white balance and the control signal obtained from the control unit 139. The background gain adjustment unit 134 obtains the R imaging signal with adjusted gain from the gain adjustment unit 131, obtains the G imaging signal from the image sensor 117, and obtains the B imaging signal with adjusted gain from the gain adjustment unit 132. Also, the background gain adjustment unit 134 obtains a control signal relating to gain adjustment from the control unit 139 described below.

Also, the background gain adjustment unit 134 adjusts the total gain (hereinafter also referred to as background image gain or master gain) of the brightness of the background image, which is the overall gain of the R imaging signal, the G imaging signal, and the B imaging signal, on the basis of the control signals relating to gain adjustment.

The background gain adjustment unit 134 outputs the R imaging signal, the G imaging signal, and the B imaging signal with the background image gain (master gain) adjusted on the basis of the control signals relating to gain adjustment to the background evaluation information obtaining unit 135 and the background image generation unit 15.

Background Evaluation Information Obtaining Unit 135

The background evaluation information obtaining unit 135 (first evaluation information obtaining unit) obtains evaluation information for the brightness of the background image (first image) using the plurality of imaging signals (R imaging signal, G imaging signal, and B imaging signal) with gain adjusted for the background image (first image). The background evaluation information obtaining unit 135 obtains the R imaging signal, the G imaging signal, and the B imaging signal with adjusted background image gain (master gain) from the background gain adjustment unit 134. Then, the background evaluation information obtaining unit 135 obtains evaluation information (hereinafter also referred to as background evaluation information) for the brightness of the background image, a color image, on the basis of the R imaging signal, the G imaging signal, and the B imaging signal with adjusted master gain. The background evaluation information is the average value of the luminance values of the pixels of the background image, for example. Alternatively, integration of the maximum value of the RGB pixel values may be used. Note that the background evaluation information is not limited to this example, and the background evaluation information obtaining unit 135 can obtain various types of information for each pixel of the background image as the background evaluation information. The background evaluation information obtaining unit 135 outputs the obtained evaluation information (background evaluation information) to the background total gain obtaining unit 136.

Background Total Gain Obtaining Unit 136

The background total gain obtaining unit 136 (first obtaining unit) obtains the total gain (hereinafter also referred to as background total gain) for the brightness adjustment relating to the background image (first image). The background total gain obtaining unit 136 compares the evaluation information (background evaluation information) and the preset target information to obtain the background total gain (first image information) for the brightness adjustment of the background image (first image).

In a case where the evaluation information is less than the target information for example, the background total gain obtaining unit 136 (first obtaining unit) obtains (sets) the background total gain (first image information) so that the brightness of the background image (first image) is increased. Also, in a case where the evaluation information is more than the target information, the background total gain obtaining unit 136 (first obtaining unit) sets the background total gain (first image information) so that the brightness of the background image (first image) is decreased.

The background total gain obtaining unit 136 (first obtaining unit) can adjust at least one parameter including the intensity of the white light source 20 (first light source), the exposure time of the imaging unit 11, and the gain of the plurality of imaging signals to change the background total gain (first image information) setting.

For example, the background total gain obtained by the background total gain obtaining unit 136 can be represented by the following Formula (1).

$$\text{Background total gain} = \tag{1}$$
$$\text{intensity of white light} \times \text{exposure time} \times \text{master gain}$$

The intensity of white light, exposure time, and master gain are parameters for adjusting the background total gain. By adjusting these parameters, the background total gain setting can be changed. By changing the background total gain setting, control can be performed to increase or decrease the brightness of the background image. Herein, "exposure time×master gain" represents the sensitivity of the background image (first image). By adjusting at least one of the two parameters, the sensitivity of the background image (first image) can be adjusted. For example, if Formula (1) is represented using the sensitivity of the background image (first image), the background total gain becomes "intensity of white light×sensitivity of background image (first image)".

The control unit 139 can adjust the sensitivity of the background image (first image) using at least one of the exposure time of the imaging unit 11 that generates an electrical signal by receiving light, the gain (electrical signal amplification amount) applied to the electrical signal generated by the imaging unit 11, and the gain (electrical signal amplification amount) applied to the electrical signal used for generating the background image (first image) by the image generation unit 18.

In the case of increasing the brightness of the background image (first image), the background total gain obtaining unit 136 (first obtaining unit) changes the setting of the background total gain (first image information) by prioritizing the adjustment of the intensity of the white light source 20 (first light source). Also, in the case of decreasing the brightness of the background image (first image), the background total gain obtaining unit 136 (first obtaining unit) can change the setting of the background total gain (first image information) by prioritizing the adjustment of the gain of the plurality of imaging signals (the R imaging signal, the G imaging signal, and the B imaging signal).

Fluorescence Total Gain Obtaining Unit 138

The fluorescence total gain obtaining unit 138 (second obtaining unit) obtains the total gain (hereinafter also referred to as fluorescence total gain) for the brightness adjustment relating to the fluorescent image (second image). The fluorescence total gain obtaining unit 138 obtains the ratio between the background total gain (first image information) relating to the brightness adjustment of the background image and the fluorescence total gain (second image information) relating to the brightness adjustment of the fluorescent image as a ratio (hereinafter also referred to as the background/fluorescence ratio or the second ratio) set by a user externally. The fluorescence total gain obtaining unit 138 (second obtaining unit) obtains the fluorescence total gain (second image information) relating to the brightness adjustment of the fluorescent image (second image) using the predetermined ratio (background/fluorescence ratio) and the background total gain (first image information).

Specifically, a background/fluorescence ratio Ro can be represented by the following Formula (2). Note that the background/fluorescence ratio may be stored in a storage unit 145 in advance, and the control unit 139 may obtain this data from the storage unit 145.

$$\text{Background/fluorescence ratio } Ro = \tag{2}$$
$$\text{fluorescence total gain } Sf / \text{background total gain } Sw$$

Also, the fluorescence total gain obtaining unit 138 obtains the background total gain output from the background total gain obtaining unit 136 and obtains the fluorescence total gain using the background total gain and the background/fluorescence ratio.

Here, the fluorescence total gain obtained by the fluorescence total gain obtaining unit 138 can be represented by the following Formula (3).

$$\text{Fluorescence total gain} = \text{intensity of excitation} \tag{3}$$
$$\text{light} \times \text{exposure time} \times \text{gain of flouorescence imaging signal}$$

The intensity of excitation light, exposure time, and gain of the fluorescence imaging signal are parameters for adjusting the fluorescence total gain. By adjusting these parameters, the fluorescence total gain setting can be changed. By changing the fluorescence total gain setting, control can be performed to increase or decrease the brightness of the fluorescent image. In other words, the fluorescence total gain obtaining unit 138 (second obtaining unit) can adjust at least one parameter including the intensity of the excitation light source 22 (second light source), the exposure time of the imaging unit 11, and the gain of the imaging signal (fluorescence imaging signal) to change the fluorescence total gain (second image information) setting. Herein, "exposure time×gain of fluorescence imaging signal" represents the sensitivity of the fluorescent image (second image). By adjusting at least one of the two parameters, the sensitivity of the fluorescent image (second image) can be adjusted. For example, if Formula (3) is represented using the sensitivity of the fluorescent image (second image), the fluorescence total gain becomes "intensity of excitation light×sensitivity of fluorescent image (second image)".

The control unit 139 can adjust the sensitivity of the fluorescent image (second image) using at least one of the exposure time of the imaging unit 11 that generates an electrical signal by receiving light, the gain (electrical signal amplification amount) applied to the electrical signal generated by the imaging unit 11, and the gain (electrical signal amplification amount) applied to the electrical signal used for generating the fluorescent image (second image) by the image generation unit 18.

In the case of increasing the brightness of the fluorescent image (second image), the fluorescence total gain obtaining unit 138 (second obtaining unit) changes the setting of the fluorescence total gain (second image information) by prioritizing the adjustment of the intensity of the excitation light source 22 (second light source). Also, in the case of decreasing the brightness of the fluorescent image (second image), the fluorescence total gain obtaining unit 138 (second obtaining unit) can change the setting of the fluorescence total gain (second image information) by prioritizing the adjustment of the gain of the imaging signal (fluorescence imaging signal).

Control Unit 139

The control unit 139 controls the intensity of the first irradiation light emitted by the white light source 20 (first light source) and the sensitivity (product of exposure time and master gain) of the background image (first image) and the intensity of the second irradiation light emitted by the excitation light source 22 (second light source) and the sensitivity (product of exposure time and gain of the fluorescence imaging signal) of the fluorescent image (second image). The control unit 139 can control at least one of the intensity of the first irradiation light emitted by the first light source, the sensitivity of the first image, the intensity of the second irradiation light emitted by the second light source, and the sensitivity of the second image on the basis of the background total gain (first image information) and the fluorescence total gain (second image information) so that the ratio between the intensity of the first irradiation light and the intensity of the second irradiation light is within a predetermined range.

The control unit 139 receives the background total gain (first image information) and determines which parameter from among the master gain, the exposure time, and the intensity of the white light source 20 to control. The control unit 139 generates a control signal for controlling the determined parameter.

Also, the control unit 139 receives the fluorescence total gain (second image information) and determines which parameter from among the gain of the fluorescence imaging signal, the exposure time, and the intensity of the excitation light source 22 to control. The control unit 139 generates a control signal for controlling the determined parameter. When controlling the intensity of the first irradiation light, the control unit 139 prioritizes control of the intensity of the second irradiation light over the sensitivity of the second image. Also, when controlling the sensitivity of the first image, the control unit 139 prioritizes control of the sensitivity of the second image over the intensity of the second irradiation light. When controlling the intensity of the second irradiation light, the control unit 139 prioritizes control of the intensity of the first irradiation light over the sensitivity of the first image. Also, when controlling the sensitivity of the second image, the control unit 139 prioritizes control of the sensitivity of the first image over the intensity of the first irradiation light.

The control unit 139 controls at least one of the white light source 20 and the excitation light source 22 so that the ratio between the intensity of the first irradiation light emitted from the white light source 20 and the intensity of the second irradiation light emitted from the excitation light source 22 is the set irradiation light intensity ratio, within the adjustment range of the white light source 20 (first light source) and the adjustment range of the excitation light source 22 (second light source). Within the adjustment range of the white light source 20 and the excitation light source 22, in a case where there is insufficient brightness needed to maintain the background/fluorescence ratio setting with just the control to maintain the irradiation light intensity ratio, the exposure time and the gain may be used together.

Control of Brightness of Background Image

The control unit 139 obtains the background total gain from the background total gain obtaining unit 136 and determines which parameter from among the parameters (master gain, exposure time, and intensity of white light) relating to the background total gain to use to control the brightness of the background image. Then, the control unit 139 generates a control signal for controlling the brightness of the background image using the determined parameter and outputs the generated control signal.

In the case of controlling the background image gain (master gain), the control unit 139 outputs a control signal for controlling the brightness of the background image to the background gain adjustment unit 134. The background gain adjustment unit 134 outputs the R imaging signal, the G imaging signal, and the B imaging signal with the background image gain (master gain) adjusted on the basis of the control signal relating to gain adjustment. Also, in the case of controlling the exposure time, the control unit 139 outputs a control signal for controlling the brightness of the background image to the imaging unit 11. The shutters 112, 113, and 114 of the imaging unit 11 control the exposure time according to the control signal. Also, in the case of controlling the intensity (white light intensity) of the first irradiation light of the white light source 20 in the adjustment range of the white light source 20 (first light source), the control unit 139 generates a control signal for controlling the brightness of the background image and outputs the control signal to the white light source 20 of the light source 23. The white light source 20 controls the amount of light output according to the control signal.

Control of Brightness of Fluorescent Image

The control unit 139 obtains the fluorescence total gain from the fluorescence total gain obtaining unit 138. Also, the control unit 139 obtains a range setting for the intensity ratio (hereinafter referred to as the irradiation light intensity ratio) between the white light and the excitation light set by a user externally. Also, the control unit 139 may separately obtain information indicating the adjustment range of the intensity of the white light and information indicating the adjustment range of the intensity of the excitation light. By using the adjustment range of the intensity of the white light and the adjustment range of the intensity of the excitation light as well as the set range for the irradiation light intensity ratio, the flexibility in adjusting the brightness of the fluorescent image can be enhanced by allowing small adjustments to the brightness of the fluorescent image and the like. Note that information indicating the irradiation light intensity ratio, the adjustment range of the intensity of the white light, and the adjustment range of the intensity of the excitation light may be stored in the storage unit 145 in advance, and the control unit 139 may obtain this data from the storage unit 145.

Then, the control unit 139 uses the fluorescence total gain and the range setting for the irradiation light intensity ratio to determine which parameter from among the parameters (fluorescence gain, exposure time, and intensity of excitation light) relating to the fluorescence total gain to use to control the brightness of the fluorescent image. Then, the control unit 139 generates a control signal for controlling the brightness of the fluorescence image using the determined parameter and outputs the generated control signal.

For example, in the case of controlling the fluorescence gain, the control unit 139 outputs the generated control signal to the gain adjustment unit 133. The gain adjustment unit 133 adjusts the gain of the fluorescence imaging signal on the basis of the control signal. Also, in the case of controlling the exposure time, the control unit 139 outputs the generated control signal to the imaging unit 11. The shutter 115 of the imaging unit 11 controls the exposure time according to the control signal. Also, in the case of controlling the intensity (excitation light intensity) of the second irradiation light of the excitation light source 22 within the adjustment range of the excitation light source 22 (second light source), the control unit 139 outputs the generated control signal to the excitation light source 22 of the light source 23. The excitation light source 22 controls the amount of light output according to the control signal.

Image Generation Unit 18

Background Image Generation Unit 15

The background image generation unit 15 (first image generation unit) generates the background image (first image) on the basis of the plurality of imaging signals with gain adjusted by the background gain adjustment unit 134 (first image gain adjustment unit). Each time the background gain adjustment unit 134 generates an R imaging signal, a G imaging signal, and a B imaging signal with an adjusted master gain, the background image generation unit 15 successively obtains the R imaging signal, the G imaging signal, and the B imaging signal generated by the background gain adjustment unit 134. The background image generation unit 15 successively generates the background image on the basis of the R imaging signal, the G imaging signal, and the B imaging signal with adjusted master gain.

Fluorescent Image Generation Unit 16

The fluorescent image generation unit 16 (second image generation unit) generates the fluorescent image (second image) on the basis of the imaging signal with gain adjusted by the gain adjustment unit 133 (second image gain adjustment unit). Each time the gain adjustment unit 133 generates a fluorescence imaging signal with adjusted fluorescence gain, the fluorescent image generation unit 16 successively generates a fluorescent image on the basis of the fluorescence imaging signal generated by the gain adjustment unit 133.

Image Combining Unit 17

The image combining unit 17 outputs an image signal of a combined image including the combined background image (first image) and the fluorescent image (second image). The image combining unit 17 obtains the background image from the background image generation unit 15 and the fluorescent image from the fluorescent image generation unit 16 and combines the background image and the fluorescent image via alpha blending or the like to generate a combined image. As a result, an image with a fluorescent image (fluorescence component) superimposed as a marker on the background image is obtained and displayed on a display unit 31 of the display apparatus 30.

Configuration of Display Apparatus 30

The imaging apparatus 1 (processing apparatus) according to the present embodiment can connect to the display apparatus 30 via a communication unit (not illustrated). The communication unit functions as a connection interface between the imaging apparatus 1 (processing apparatus) and the display apparatus 30, and the communication unit transmits various types of information relating to the imaging unit 11, the image processing unit 13, and the image generation unit 18 to the display apparatus 30. For example, the various types of information include, in addition to the combined image, various types of parameters (for example, exposure time, intensity of white light, master gain, intensity of excitation light, fluorescence gain, and the like) set for the imaging unit 11 and the image processing unit 13 when generating the combined image (background image and fluorescent image).

The display apparatus 30 includes the display unit 31, a display control unit 32, and an operation unit 33. The display unit 31 is constituted by a liquid crystal display or an organic EL display, for example. The display control unit 32 perform display control to display the various types of information obtained from the imaging apparatus 1 (processing apparatus) on the display unit 31. The display control unit 32 performs display control to display the image with the fluorescent image (second image) superimposed on the background image (first image) on the display unit 31 on the basis of the image signal output from the imaging apparatus 1 (processing apparatus). Also, the operation unit 33 is constituted by a dial, a mouse, an operation button, or the like and inputs various types of instructions from the user. The display unit 31 and the operation unit 33 may be integrally implemented as a touch panel.

The display control unit 32 obtains the combined image generated by the image combining unit 17 via the communication unit and performs display control to display the obtained combined image on the display unit 31. Also, the display control unit 32 can also perform display control to display various types of parameters set for the imaging unit 11 and the image processing unit 13 when generating the combined image (background image and fluorescent image) and the combined image on the display unit 31. In response to an input from the operation unit 33, the display control unit 32 can change the various types of parameters to be displayed together with the combined image and display these on the display unit 31.

In response to a user input via the operation unit 33, the display control unit 32 can perform display control to display a screen (user interface screen) for setting the external setting parameters for the imaging apparatus 1

(processing apparatus) on the display unit 31. Here, the external setting parameters include, for example, the background/fluorescence ratio and the irradiation light intensity ratio, the adjustment range of the intensity of white light, and the adjustment range of the intensity of excitation light, as well as a background/fluorescence ratio 2, an additional fluorescence gain, and similar parameters described below. For example, the image processing unit 13 of the imaging apparatus 1 (processing apparatus) can obtain the external setting parameters input by a user via the communication unit. The external setting parameters obtained via the communication unit may be stored in the storage unit 145 in advance, and the control unit 139 may obtain this data from the storage unit 145.

Brightness Control Processing Flow

Next, brightness control processing performed by the imaging apparatus 1 (processing apparatus) according to the first embodiment will be described with reference to the flowchart of FIG. 2.

Note that regarding the operations of the imaging apparatus 1 (processing apparatus), each imaging signal is assumed to be successively obtained at a predetermined sampling timing so that combined images based on each imaging signal can be displayed as a video at 60 fps. Note that a still image may be obtained instead of video.

Step S201

In step S201, the range of the background/fluorescence ratio and the irradiation light intensity ratio are set. For the setting for the range of the background/fluorescence ratio and the irradiation light intensity ratio, the image processing unit 13 may obtain a preset default value. The default value of the setting for the range of the irradiation light intensity ratio may be set so that the intensity of the excitation light is the maximum when the intensity of the white light is the maximum. Note that in step S201, in addition to the range of the irradiation light intensity ratio, information indicating the adjustment range of the intensity of the white light and information indicating the adjustment range of the intensity of the excitation light may be set.

Also, for a combined image generated using the default value as the setting for the background/fluorescence ratio and displayed on the display unit 31 of the display apparatus 30, the user may perform adjustments using the operation unit 33, such as a dial, mouse, or the like, to give the fluorescence portion a more noticeable brightness against the background, for example. Thereafter, the ratio between the background total gain and the fluorescence total gain may be set as the background/fluorescence ratio for a specific time phase in which an image confirmed via the user pressing a confirmation button or the like was obtained.

In a similar manner, when setting the range for the irradiation light intensity ratio, for the combined image displayed in the display unit 31 of the display apparatus 30, the user may check the degree of white balance offset and the noise and set a value that adjusts the range as the range of the intensity ratio.

Step S202

In step S202, a photometry region is set. The image processing unit 13 may obtain a region set manually by the user as the photometry region. Alternatively, as the photometry region, the image processing unit 13 may use a region which is preset regarding shape and size with respect to an image.

Step S203

In step S203, the imaging unit 11 obtains the R imaging signal, the G imaging signal, the B imaging signal, and the fluorescence imaging signal.

Step S204

In step S204, the background evaluation information obtaining unit 135 calculates the evaluation information of the brightness of the background image. The range for evaluating the brightness of the background image may be the entire background image or may be the photometry region set in step S202. Also, as the brightness of the background image, the average value of the luminance values of the pixels may be used or the integration of the maximum value of the RGB pixel values may be used.

Step S205

In step S205, the background total gain obtaining unit 136 sets the background total gain on the basis of the background evaluation information calculated in step S204 and preset target information.

Step S206

In step S206, the fluorescence total gain obtaining unit 138 uses a background total gain Sw set in step S205 and the background/fluorescence ratio set in step S201 to obtain the fluorescence total gain. The fluorescence total gain obtaining unit 138 can obtain the fluorescence total gain Sf via operation processing using Formula (2) described above, wherein the background total gain is Sw, the fluorescence total gain is Sf, and the background/fluorescence ratio is Ro.

Step S207

In step S207, the control unit 139 determines the parameter for controlling the brightness of the background image. The control unit 139 obtains the background total gain from the background total gain obtaining unit 136 and determines which parameter from among the parameters (master gain, exposure time, and intensity of white light) relating to the background total gain to use to control the brightness of the background image. Note that the determined parameter is not limited to one, and a plurality of parameters may be used together.

Step S208

In step S208, the control unit 139 determines the intensity of the excitation light on the basis of the intensity of the white light determined in step S207, the irradiation light intensity ratio set in step S201, and the fluorescence total gain setting information Sf.

For example, in a case where the range setting for the intensity ratio between the white light and the excitation light ranges from 1 times to 1.25 times, the intensity of the excitation light is the maximum when the intensity of the white light is the maximum. When the intensity of the white light is 80% of the maximum, using the intensity of the white light as a reference, the intensity of the excitation light is set in a range from 1 times to 1.25 times. In other words, the intensity of the excitation light is determined so that the light amount is equal to or close to the setting information Sf of the fluorescence total gain when the intensity of the excitation light is between 80% or greater with respect to the maximum (1 times the intensity of the white light) and 100% or less (1.25 times the intensity of the white light).

Step S209

In step S209, the control unit 139 determines the parameter (for example, the exposure time or the gain of the fluorescence imaging signal) for controlling the brightness of the fluorescent image other than the intensity of the excitation light. In a case where the light amount does not become equal to or close to the setting information Sf of the fluorescence total gain with just an adjustment of the intensity of the excitation light, the control unit 139 determines a parameter for controlling the brightness to use together with the intensity of the excitation light.

In the case of increasing the brightness of the fluorescent image, for example, when adjusting the exposure time to make the light amount equal to or close to the setting information Sf of the fluorescence total gain, the control unit 139 sets the exposure time as the parameter. Also, in a case where the light amount does not equal or come close to the setting information Sf of the fluorescence total gain within the adjustment range of the exposure time, the control unit 139 sets the exposure time and the gain of the fluorescence imaging signal as the parameters.

When decreasing the brightness of the fluorescent image with the fluorescence imaging signal in a gain-adjusted state, in a case where the light amount becomes equal to or close to the setting information Sf of the fluorescence total gain by adjusting the gain of the fluorescence imaging signal, the control unit 139 sets the gain of the fluorescence imaging signal as the parameter. Also, in a case where the light amount does not equal or come close to the setting information Sf of the fluorescence total gain within the adjustment range of the gain of the fluorescence imaging signal, the control unit 139 sets the exposure time and the gain of the fluorescence imaging signal as the parameters.

Step S210

In step S210, the control unit 139 adjusts the brightness of the background image according to the set parameter/s.

For example, in the case of controlling the master gain, the control unit 139 outputs a control signal for controlling the brightness of the background image to the background gain adjustment unit 134. The background gain adjustment unit 134 adjusts the background image gain (master gain), which is the overall gain of the R imaging signal, the G imaging signal, and the B imaging signal, on the basis of the control signal.

In the case of controlling the exposure time, the control unit 139 outputs a control signal for controlling the brightness of the background image to the imaging unit 11. The shutters 112, 113, and 114 of the imaging unit 11 control the exposure time according to the control signal.

In the case of controlling the intensity of the white light, the control unit 139 outputs a control signal for controlling the brightness of the background image to the white light source 20 of the light source 23. The white light source 20 controls the amount of light output according to the control signal.

Step S211

In step S211, the control unit 139 adjusts the brightness of the fluorescent image according to the set parameter/s.

For example, in the case of controlling the fluorescence gain, the control unit 139 outputs the generated control signal to the gain adjustment unit 133. The gain adjustment unit 133 adjusts the gain of the fluorescence imaging signal on the basis of the control signal. Also, in the case of controlling the exposure time, the control unit 139 outputs the generated control signal to the imaging unit 11. Also, in the case of controlling the intensity of the excitation light, the control unit 139 outputs the generated control signal to the excitation light source 22 of the light source 23. The excitation light source 22 controls the amount of light output according to the control signal.

Step S212

In step S212, the image combining unit 17 generates a combined image of the brightness-adjusted background image and the fluorescent image. The combined image is displayed on the display unit 31 of the display apparatus 30 so the user can check it. The display control unit 32 of the display apparatus 30 obtains the combined image generated by the image combining unit 17 via the communication unit and performs display control to display the obtained combined image on the display unit 31.

After step S212, the processing returns to step S203 where the next imaging signals (RGB imaging signal, fluorescence imaging signal) are obtained, and the processing of each step is repeated.

Note that, for example, processing by the control unit 139 to determine whether or not pixel information (for example, luminance) of the background image has changed using the background evaluation information may be provided, and only if the luminance of the background image has changed, the processing from step S204 to step S212 may be executed.

In other words, if the luminance of the background image has not changed, the processing relating to brightness adjustment from step S204 to step S212 is not executed, allowing for a reduction in power consumption. The processing to determine whether or not the luminance of the background image has changed may be executed after step S203, for example.

The background/fluorescence ratio and the irradiation light intensity ratio may be set after the photometry region is determined. For example, the corresponding relationship between the photometry region, the background/fluorescence ratio, and the irradiation light intensity ratio may be stored in the storage unit 145 of the image processing unit 13. Depending on the photometry region set in step S202, the control unit 139 may reference the corresponding relationship between the photometry region, the background/fluorescence ratio, and the irradiation light intensity ratio stored in the storage unit and determine the background/fluorescence ratio and the irradiation light intensity ratio according to the set photometry region.

Also, when the control unit 139 determines the parameter for controlling the brightness of the background image in step S207, on the basis of the irradiation light intensity ratio set in step S201, the adjustment range of the intensity of the white light, and the adjustment range of the intensity of the excitation light, the intensity of the white light may be determined.

For example, if the irradiation light intensity ratio setting is m times (for example, 2 times), the adjustment range of the intensity of the white light is from 0% to 100%, and the adjustment range of the intensity of the excitation light is from 50% to 100%, the intensity of the white light is controlled to be from 25% to 50%, and due to the insufficient brightness needed to maintain the background/fluorescence ratio setting, a parameter for controlling the brightness of the background image other than the intensity of the light source may also be used.

Also, the irradiation light intensity ratio may be maintained only in a case where the intensity of the white light and the intensity of the excitation light are adjustable within the adjustment range of the white light source 20 (first light source) and the adjustment range of the excitation light source 22 (second light source).

Take an example in which the irradiation light intensity ratio setting is 2 times, the adjustment range of the intensity of the white light is from 0% to 100%, and the adjustment range of the intensity of the excitation light is from 50% to 100%. In a case where the control unit 139 controls the intensity of the white light within a range from 0% to 25%, the control unit 139 may control the intensity of the excitation light to be 50% to maintain the irradiation light intensity ratio.

The irradiation light intensity ratio can be set within a range that does not exceed the upper limit (100%) of the adjustment range, and for example, in a case where the irradiation light intensity ratio is 2 times and the adjustment range of the intensity of the white light is from 25% to 50%, the adjustment range of the intensity of the excitation light can be set to 2 times (from 50% to 100%) the adjustment range of the intensity of the white light. Also, in a case where the adjustment range of the intensity of the white light is from 50% to 100%, the adjustment range of the intensity of the excitation light is 100% (50% of the lower limit of the adjustment range of the intensity of the white light×2).

Also, the imaging apparatus 1 (processing apparatus) includes a first operation mode for keeping the ratio between the intensity of the first irradiation light and the intensity of the second irradiation light within a predetermined range and a second operation mode in which the range for the ratio between the intensity of the first irradiation light and the intensity of the second irradiation light is broader than in the first operation mode. The control unit 139 of the imaging apparatus 1 (processing apparatus) can switch between the first operation mode for keeping the irradiation light intensity ratio within the predetermined range and the second operation mode with a more relaxed restriction for the irradiation light intensity ratio that is broader in terms of range than the predetermined range. For example, the control unit 139 can switch between the first operation mode and the second operation mode depending on the type of light source or upon a change in the image capture scene where the relative distance between the imaging unit 11 and the object P changes.

The light source 23 may include the white light source 20 and a third light source different from the excitation light source 22. For example, the third light source may be an excitation light source that outputs a different color excitation light to the excitation light source 22 (second light source). The control unit 139 controls the intensity of a third irradiation light emitted by the excitation light source (third light source) and the sensitivity (product of exposure time and gain of the fluorescence imaging signal) of a fluorescent image (third image).

The control unit 139 can control at least one of the intensity of the first irradiation light emitted by the first light source, the sensitivity of the first image, the intensity of the third irradiation light emitted by the third light source, and the sensitivity of the third image on the basis of the background total gain (first image information) and fluorescence total gain (third image information) relating to the fluorescent image (third image) so that the ratio between the intensity of the first irradiation light and the intensity of the third irradiation light is within a predetermined range.

In other words, for the first light source, the second light source, and the third light source, the control unit 139 controls at least one of the intensity of the first irradiation light emitted by the white light source 20 (first light source), the sensitivity of the first image, the intensity of the second irradiation light emitted by the excitation light source 22 (second light source), and the sensitivity of the second image on the basis of the background total gain (first image information) and the fluorescence total gain (second image information) so that the ratio between the intensity of the first irradiation light and the intensity of the second irradiation light is within a predetermined range.

Also, the control unit 139 can control at least one of the intensity of the first irradiation light, the sensitivity of the first image, the intensity of the third irradiation light emitted by the third light source, and the sensitivity of the third image on the basis of the background total gain (first image information) and the fluorescence total gain (third image information) relating to adjusting the brightness of the third image obtained from the third light source so that the ratio between the intensity of the first irradiation light and the intensity of the third irradiation light emitted by the third light source is within a predetermined range.

The control unit 139 receives the fluorescence total gain (third image information) relating to the fluorescent image (third image) and adjusts the intensity of the third irradiation light emitted by the excitation light source (third light source) and the sensitivity (product of exposure time and gain of the fluorescence imaging signal) of the third image of the fluorescent image (third image). The control unit 139 determines which parameter from among the gain of the fluorescence imaging signal, the exposure time, and the intensity of the excitation light source to control. The control unit 139 can generate a control signal for controlling the determined parameter.

The ratio between the intensity of the first irradiation light and the intensity of the second irradiation light and the ratio between the intensity of the first irradiation light and the intensity of the third irradiation light emitted from the third light source can be set to any ratio. The ratios may be set to be the same or different.

The control unit 139 may control the intensity of the white light source 20 and the excitation light source 22 with the different operation modes using a first combination of the white light source 20 and the excitation light source 22 and a second combination of the white light source 20 and the third light source different from the excitation light source 22. Also, the control unit 139 may execute processing in the first operation mode to keep the irradiation light intensity ratio between the white light source 20 and the excitation light source 22 within the predetermined range using the first combination and may execute processing in the second operation mode to control the irradiation light intensity ratio at a constant irradiation light intensity ratio within a broader range than the predetermined range using the second combination.

Also, in a case where the brightness of the background image and the fluorescent image is equal to or less than a predetermined threshold, the control unit 139 may execute processing in the first operation mode to control the irradiation light intensity ratio between the first light source and the second light source at a constant value within a predetermined range. Also, in a case where the brightness of at least one of the background image and the fluorescent image changes to exceed a predetermined threshold, the control unit 139 may switch from processing in the first operation mode to processing in the second operation mode to control the irradiation light intensity ratio at a constant value within a broader range than the predetermined range.

For example, in step S208, when the control unit 139 determines the intensity of the excitation light, the control unit 139 may take into consideration the operation mode. Also, regarding setting the irradiation light intensity ratio, instead of a range designation, a single fixed value may be used, such as m times (for example, "2 times").

Example of Time-Division Control

Next, an example of time-division control will be described with reference to FIG. 3. FIG. 3 is a timing chart relating to (3*a*) the output timing of the white light from the white light source 20, (3*b*) the output timing of the excitation light from the excitation light source 22, (3*c*) the exposure timing for each image sensor, (3*d*) the output timing of the imaging signal for each image sensor, and (3*e*) the output timing of the combined image obtained by the image combining unit 17.

In this example, each image sensor (116 to 119) is a rolling shutter image sensor in which each pixel in a row in order from up to down perform exposure and imaging signal output.

As described above, the R (red) light of the reflected light and the red fluorescence are spectrally separated in the same direction at the prism 111. Thus, by performing control by switching the irradiation timing of the white light source 20 and the excitation light source 22 and the exposure timing of each image sensor in a time-division manner, the R (red) light of the reflected light and the red fluorescence can each be received by the image sensor (116, 119).

Specifically, the white light source 20 emits white light in a cycle of once per 2 frames in sync with the imaging signal output timing of the image sensor (3*a*). On the other hand, the excitation light source 22 emits excitation light every frame (3*b*).

The imaging signal of the time period of exposure timing c1 in FIG. 3 is output from the image sensor 119 in the time from time T1 to T2. This time period corresponds to an imaging signal including the white light source 20 in an always off state and the excitation light source 22 in an on state, and the red imaging signal of the time period is treated as a fluorescence imaging signal.

The imaging signal of the time period of exposure timing c2 is output from the image sensors (116, 117, 118) in the time from T2 to T3. This time period corresponds to an imaging signal including the white light source 20 in an on state, and the imaging signals (R2, B2, C2) output from the image sensors (116, 117, 118) in this time period are obtained as the RGB imaging signals.

The imaging signals (fluorescence 3, 5, 7, 9) output from the image sensor 119 in the time period of exposure timings c3, c5, c7, and c9 can be obtained as fluorescence imaging signals in a similar manner as performed in the exposure timing c1. The imaging signals of the time period of exposure timings c4, c6, and c8 can be obtained as RGB imaging signals in a similar manner as performed in the exposure timing c2.

Regarding the output timing of the combined image obtained by the image combining unit 17, the image combining unit 17 synchronizes the output timing of the imaging signals of the image sensors and outputs the combined image at a cycle of once per 2 frames.

Specifically, the combined image output from at the point in time of time T4 includes the fluorescence components of the fluorescent images (fluorescence 1, fluorescence 3) of the exposure timing c1 and the exposure timing c3 added together then halved and superimposed as a marker onto the background image (background 2) generated from the RGB imaging signals of the time period of the exposure timing c2.

Since the time period of the exposure timing c2 includes the excitation light source 22 in an on state, in some cases, the B imaging signal may include the reflected light of the excitation light. Also, in some cases, the R imaging signal may include fluorescence. The fluorescence included in the R imaging signal is overwritten by the fluorescence component marker when the combined image is generated, making it less noticeable. Regarding the reflected light of the excitation light included in the B imaging signal, as with a known technique, by controlling the ratio between the intensity of the white light and the intensity of the excitation light to be within a predetermined range, a combined image with suppressed variation in the white balance of the background image is generated.

According to the first embodiment, the ratio between the intensity of the white light and the intensity of the excitation light is control to be within the set irradiation light intensity ratio range. Accordingly, brightness can be automatically adjusted while suppressing variation in the white balance of a background image in a case where the reflected light of excitation light is mixed in the background image.

Second Embodiment

In the first embodiment, the setting information of the fluorescence total gain is calculated from the background total gain and the background/fluorescence ratio. In the second embodiment, the imaging apparatus 1 (processing apparatus) calculates the setting information of the fluorescence total gain on the basis of the brightness of the fluorescent image, and this configuration will be described with reference to the block diagram of FIG. 4.

In the imaging apparatus 1 (processing apparatus) according to the second embodiment, in addition to the configuration of the first embodiment, a fluorescence evaluation information obtaining unit 137 (second evaluation information obtaining unit) is included. The fluorescence evaluation information obtaining unit 137 (second evaluation information obtaining unit) uses the imaging signal (fluorescence imaging signal) with the gain adjusted by the gain adjustment unit 133 (second image gain adjustment unit) to obtain the evaluation information (hereinafter also referred to as the fluorescence evaluation information) of the brightness of the fluorescent image (second image). The fluorescence evaluation information is the average value of the luminance values of the pixels of the fluorescent image, for example. Alternatively, integration of the pixel values of the fluorescent image may be used. Note that the fluorescence evaluation information is not limited to this example, and the fluorescence evaluation information obtaining unit 137 can obtain various types of information for each pixel of the fluorescent image as the fluorescence evaluation information. The fluorescence evaluation information obtaining unit 137 outputs the evaluation information (fluorescence evaluation information) of the brightness of the fluorescent image (second image) to the fluorescence total gain obtaining unit 138.

The fluorescence total gain obtaining unit 138 (second obtaining unit) obtains the fluorescence total gain (second image information) relating to the brightness adjustment of the fluorescent image (second image) on the basis of the evaluation information (fluorescence evaluation information) of the brightness of the fluorescent image (second image). By comparing the evaluation information and preset target information, the fluorescence total gain (second image information) is obtained (set) for the brightness adjustment of the fluorescent image (second image). For example, if the fluorescence evaluation information is large relative to the target information of the brightness, the fluorescence total gain obtaining unit 138 sets the fluorescence total gain so that the brightness of the fluorescent image is decreased. Also, if the fluorescence evaluation information is smaller than the target information, the fluorescence total gain obtaining unit 138 sets the fluorescence total gain so that the brightness of the fluorescent image is increased. The fluorescence total gain obtaining unit 138 outputs the set fluorescence total gain to the control unit 139.

As in the first embodiment, the control unit 139 may determine the parameter to control the brightness of the background image and the fluorescent image and generate a control signal for the determined parameter.

According to the second embodiment also, with the imaging apparatus 1 (processing apparatus) that sets the setting information of the fluorescence total gain on the basis of the brightness of the fluorescent image, the ratio between the intensity of the white light and the intensity of the excitation light is controlled to be within the set irradiation light intensity ratio range. Accordingly, brightness can be automatically adjusted while suppressing variation in the white balance of a background image in a case where the reflected light of excitation light is mixed in the background image.

Third Embodiment

In the first embodiment, the background/fluorescence ratio and the irradiation light intensity ratio are set, and a parameter for controlling the brightness of the fluorescent image is determined on the basis of the ratios. In the third embodiment, the brightness of the fluorescent image is controlled using, from among the intensity of the excitation light, the exposure time, and the gain of the fluorescence imaging signal, the intensity of the excitation light and the gain of the fluorescence imaging signal as parameters, with the exposure time being adjusted to within the adjustment range, and this configuration will be described with reference to the block diagram of FIG. 5.

As illustrated in the block diagram of FIG. 5, "background/fluorescence ratio 2" (hereinafter also referred to as the second ratio) is used as the parameter relating to the intensity of the excitation light, and "additional fluorescence gain" is used as the parameter relating to the gain of the fluorescence imaging signal. The imaging apparatus 1 (processing apparatus) uses the background/fluorescence ratio 2 and the additional fluorescence gain to adjust the brightness to make the background/fluorescence ratio 2 constant while keeping the irradiation light intensity ratio within a predetermined range, and this configuration will be described below.

The imaging apparatus 1 (processing apparatus) according to the third embodiment includes a background gain control unit 140, a temporary fluorescence total gain obtaining unit 141, a temporary fluorescence gain control unit 142, and an additional fluorescence gain adding unit 143 instead of the fluorescence total gain obtaining unit 138 and the control unit 139 of the configuration of the first embodiment. Here, a control unit 144 according to the third embodiment includes the background gain control unit 140, the temporary fluorescence gain control unit 142, and the additional fluorescence gain adding unit 143. The temporary fluorescence total gain obtaining unit 141 (second obtaining unit) obtains a setting (hereinafter also referred to as the first setting) for adjusting the background/fluorescence ratio 2 (second ratio). The temporary fluorescence total gain obtaining unit 141 (second obtaining unit) uses the background total gain (first image information) and the background/fluorescence ratio 2 (second ratio) adjusted by the first setting to obtain the temporary fluorescence total gain (second image information).

Also, the control unit 144 (additional fluorescence gain adding unit 143) obtains a setting (hereinafter also referred to as the second setting) for adjusting the additional gain for the sensitivity of the second image.

The control unit 144 (background gain control unit 140) controls the intensity of the first irradiation light and the sensitivity of the first image on the basis of the background total gain (first image information), and the control unit 144 (temporary fluorescence gain control unit 142) controls the intensity of the second irradiation light and the sensitivity of the second image on the basis of the temporary fluorescence total gain (second image information). The control unit 144 (additional fluorescence gain adding unit 143) further adds the additional gain adjusted using the second setting to the sensitivity of the second image. The sensitivity of the second image is indicated by the product of the exposure time and the gain of the fluorescence imaging signal, and by adding the additional gain to the sensitivity of the second image, the additional gain is added to the gain of the fluorescence imaging signal. In other words, the additional gain is added to the gain applied to the electrical signal (fluorescence imaging signal) used for generating the fluorescent image (second image). By adding the additional gain, the gain (amplification amount) of the electrical signal (fluorescence imaging signal) is increased.

Since the background/fluorescence ratio 2 does not include the portion of the additional fluorescence gain relating to the gain of the fluorescence imaging signal, the background/fluorescence ratio 2 is different from the background/fluorescence ratio (ratio between the background total gain Sw and the fluorescence total gain Sf (Sf/Sw)) described in the first embodiment. Thus, to differentiate between the background/fluorescence ratio described in the first embodiment, in the third embodiment, the background/fluorescence ratio 2 (R02) is defined by the following Formula (4) using a temporary fluorescence total gain Sf2 and the background total gain Sw.

$$\text{Background/fluorescence ratio } 2(R02) = \tag{4}$$
$$\text{temporary fluorescence total gain } Sf2/\text{background total gain } Sw$$

Here, the temporary fluorescence total gain Sf2 corresponds to the fluorescence total gain Sf described in the first embodiment minus the additional fluorescence gain portion relating to the fluorescence imaging signal, and the fluorescence total gain Sf can be represented by the following Formula (5) using the temporary fluorescence total gain Sf2 and the additional fluorescence gain.

$$\text{Fluorescence total gain } Sf = \tag{5}$$
$$\text{temporary fluorescene total gain } Sf2 \times \text{additional fluorescence gain}$$

The control unit 144 obtains a ratio (background/fluorescence ratio 2:second ratio) between the information (temporary fluorescence total gain) of the fluorescence total gain (second image information) indicating the brightness of the fluorescent image (second image) minus the gain (additional fluorescence gain) of the imaging signal of the fluorescent image (second image) and the background total gain (first image information) indicating the brightness of the background image (first image).

In the third embodiment, the control (intensity adjustment) of the intensity of the excitation light source 22 (second light source) and the gain adjustment of the fluorescence imaging signal by the gain adjustment unit 133 (second image gain adjustment unit) can be individually controlled by using the background/fluorescence ratio 2 and the additional fluorescence gain.

Background Total Gain Obtaining Unit 136

In the third embodiment, the background total gain obtaining unit 136 (first obtaining unit), with the exposure time of the imaging unit 11 in an adjusted state, adjusts the intensity of the white light source 20 (first light source) or the gain of the imaging signal and obtains the background total gain. The background total gain obtaining unit 136, according to the following Formula (6), obtains the background total gain (first image information) by finding the product of the intensity of the white light source 20 (second light source) and the gain (master gain) of the plurality of imaging signals.

$$\text{Background total gain} = \text{intensity of excitation light} \times \text{master gain} \quad (6)$$

Background Gain Control Unit 140

The background gain control unit 140 obtains the background total gain from the background total gain obtaining unit 136, determines which parameter from among the parameters (master gain and intensity of white light) relating to the background total gain to use to control the brightness of the background image, generates a control signal for controlling the brightness of the background image using the determined parameter, and outputs the generated control signal.

In the case of controlling the background image gain (master gain), the background gain control unit 140 outputs a control signal for controlling the brightness of the background image to the background gain adjustment unit 134. The background gain adjustment unit 134 outputs the R imaging signal, the G imaging signal, and the B imaging signal with the background image gain (master gain) adjusted on the basis of the control signal relating to gain adjustment.

Also, in the case of controlling the intensity of the white light, the background gain control unit 140 outputs a control signal for controlling the brightness of the background image to the white light source 20 of the light source 23. The white light source 20 controls the amount of light output according to the control signal.

At this time, in the case of increasing the brightness of the background image, the background gain control unit 140 prioritizes increasing the intensity of the white light over the master gain. In a case where, by only increasing the intensity of the white light within the adjustment range for adjusting the intensity of the white light source 20, the brightness of the background image needed for maintaining the setting of the background/fluorescence ratio 2 is insufficient, the background gain control unit 140 generates a control signal for controlling the brightness of the background image and outputs the generated control signal to the background gain adjustment unit 134.

Also, when decreasing the brightness of the background image with increased master gain, decreasing the master gain is prioritized. In other words, in a case where, by only decreasing the master gain within the adjustment range for adjusting the master gain, the darkness of the background image needed for maintaining the setting of the background/ fluorescence ratio 2 is insufficient, the background gain control unit 140 generates a control signal for controlling the intensity of the white light source 20 and outputs the generated control signal to the white light source 20 of the light source 23. In this manner, with control of the brightness of the background image, an image less affected by noise can be obtained.

Specifically, the background gain control unit 140 controls the brightness of the background image as described below.

In a case where, with the intensity of the first irradiation light increased within the adjustment range of the white light source 20 (first light source), the brightness of the background image (first image) needed for maintaining the setting of the background/fluorescence ratio 2 (ratio) is insufficient, the background gain control unit 140 outputs a control signal generated for further adjusting the brightness of the background image (first image) to increase the brightness to the background gain adjustment unit 134 (first image gain adjustment unit).

In the case of decreasing the brightness of the background image, with the brightness of the background image having been adjusted by the background gain adjustment unit 134 to increase the brightness, the background gain control unit 140 outputs a control signal for adjusting the gain of the plurality of imaging signals (R imaging signal, G imaging signal, and B imaging signal) to decrease the gain to the background gain adjustment unit 134.

In the case of further decreasing the brightness of the background image, with the brightness of the background image having been adjusted by the background gain adjustment unit 134 to decrease the brightness, the background gain control unit 140 outputs a control signal to adjust the intensity of the first irradiation light to decrease the intensity of the first irradiation light within the adjustment range of the white light source 20 to the white light source 20 (first light source).

Temporary Fluorescence Total Gain Obtaining Unit 141

The temporary fluorescence total gain obtaining unit 141 obtains the background/fluorescence ratio 2 set by a user externally. The temporary fluorescence total gain obtaining unit 141 obtains the background total gain from the background total gain obtaining unit 136 and obtains the temporary fluorescence total gain from the background total gain and the background/fluorescence ratio 2. The temporary fluorescence total gain obtaining unit 141 obtains the temporary fluorescence total gain on the basis of the relationship in Formula (4).

In the third embodiment, the temporary fluorescence total gain obtaining unit 141 (second obtaining unit), with the exposure time of the imaging unit 11 in an adjusted state, adjusts the intensity of the excitation light source 22 (second light source) or the gain of the imaging signal and obtains the temporary fluorescence total gain. The temporary fluorescence total gain obtaining unit 141, according to the following Formula (7), obtains the temporary fluorescence total gain (second image information) by finding the product of the intensity of the excitation light source 22 (second light source) and the gain (gain of the fluorescence imaging signal).

$$\text{Temporary fluorescence total gain} = \quad (7)$$
$$\text{intensity of excitation light} \times \text{gain of fluorescence imaging signal}$$

Temporary Fluorescence Gain Control Unit 142

The temporary fluorescence gain control unit 142 obtains the temporary fluorescence total gain from the temporary fluorescence total gain obtaining unit 141 and determines which parameter from among the parameters (gain of the fluorescence imaging signal and intensity of the excitation light) relating to the temporary fluorescence total gain to use to control the brightness of the fluorescent image. Then, the temporary fluorescence gain control unit 142 generates a control signal for controlling the brightness of the fluorescence image using the determined parameter and outputs the generated control signal.

In the case of controlling the gain of the fluorescence imaging signal, the temporary fluorescence gain control unit 142 outputs the generated control signal to the additional fluorescence gain adding unit 143.

The additional fluorescence gain adding unit 143 obtains the additional fluorescence gain set by a user externally. The additional fluorescence gain adding unit 143 obtains the control signal relating to the gain from the temporary fluorescence gain control unit 142 and generates a control signal with the additional fluorescence gain added to it. The gain adjustment unit 133 adjusts the gain of the fluorescence imaging signal on the basis of the control signal from the additional fluorescence gain adding unit 143.

Also, in the case of controlling the intensity of the excitation light, the temporary fluorescence gain control unit 142 outputs the generated control signal to the excitation light source 22 of the light source 23. The excitation light source 22 controls the amount of light output according to the control signal.

At this time, in the case of increasing the brightness of the fluorescent image, the temporary fluorescence gain control unit 142 prioritizes increasing the intensity of the excitation light over the gain of the fluorescence imaging signal.

In a case where, with the intensity of the second irradiation light increased within the adjustment range of the excitation light source 22 (second light source), the brightness of the fluorescent image (second image) needed for maintaining the setting of the background/fluorescence ratio 2 (ratio) is insufficient, the control unit 144 (temporary fluorescence gain control unit 142) outputs a control signal generated for further adjusting the brightness of the fluorescent image (second image) to increase the brightness to the gain adjustment unit 133 (second image gain adjustment unit) for adjusting the imaging signal of the fluorescent image (second image).

In the case of decreasing the brightness of the fluorescent image, with the brightness of the fluorescent image having been adjusted by the gain adjustment unit 133 (second image gain adjustment unit) to increase the brightness, the control unit 144 (temporary fluorescence gain control unit 142) outputs a control signal for adjusting the gain of the imaging signal of the fluorescent image to decrease the gain to the gain adjustment unit 133 (second image gain adjustment unit). Also, in the case of further decreasing the brightness of the fluorescent image, with the brightness of the fluorescent image having been adjusted by the gain adjustment unit 133 to decrease the brightness, the control unit 144 (temporary fluorescence gain control unit 142) outputs a control signal to adjust the intensity of the second irradiation light to decrease the intensity of the second irradiation light within the adjustment range of the excitation light source 22 to the excitation light source 22.

In a case where, by only increasing the intensity of the excitation light within the adjustment range for adjusting the intensity of the excitation light source 22, the brightness of the fluorescent image needed for maintaining the setting of the background/fluorescence ratio 2 is insufficient, the temporary fluorescence gain control unit 142 generates a control signal for controlling the gain of the fluorescence imaging signal and outputs the generated control signal to the additional fluorescence gain adding unit 143.

Also, when decreasing the brightness of the fluorescent image with increased fluorescence imaging signal gain, decreasing the gain of the fluorescence imaging signal is prioritized. In other words, in a case where, by only decreasing the gain of the fluorescence imaging signal within the adjustment range for adjusting the gain of the fluorescence imaging signal, the darkness of the fluorescent image needed for maintaining the setting of the background/fluorescence ratio 2 is insufficient, the temporary fluorescence gain control unit 142 generates a control signal for controlling the intensity of the excitation light source 22 and outputs the generated control signal to the excitation light source 22 of the light source 23. In this manner, with control of the brightness of the fluorescent image, a fluorescent image less affected by noise can be obtained.

Specifically, the control unit 144 (temporary fluorescence gain control unit 142) controls the brightness of the fluorescent image as described below.

The control unit 144 (temporary fluorescence gain control unit 142) adjusts the intensity of the excitation light source 22 within the adjustment range of the excitation light source 22 (second light source) and outputs a control signal for controlling the intensity of the excitation light source 22 to the excitation light source 22 in a case where the background/fluorescence ratio 2 (second ratio) can be adjusted to be constant, with the irradiation light intensity ratio set on the basis of the background/fluorescence ratio 2 (second ratio) in a constant state.

The control unit 144 (temporary fluorescence gain control unit 142) adjusts the intensity of the excitation light source 22 and outputs a control signal for generating an additional gain for increasing the gain of the imaging signal of the fluorescent image (second image) in a case where the brightness of the fluorescent image needed for maintaining the setting of the background/fluorescence ratio 2 (second ratio) is insufficient, with the irradiation light intensity ratio set on the basis of the background/fluorescence ratio 2 (second ratio) being constant. Also, the gain adjustment unit 133 (second image gain adjustment unit) outputs the imaging signal with the additional gain added on the basis of the control signal.

The control unit 144 (temporary fluorescence gain control unit 142) outputs a control signal for adjusting the additional gain to decrease the additional gain in the case of decreasing the brightness of the fluorescent image for making the background/fluorescence ratio 2 (second ratio) constant, with the additional gain added and the gain of the imaging signal adjusted.

In the third embodiment, both the background gain control unit 140 and the temporary fluorescence gain control unit 142 prioritize increasing the intensity of the irradiation light over the gain (master gain, gain of the fluorescence imaging signal). Thus, if control is performed to change the intensity of the white light and the intensity of the excitation light by the same percentage within the adjustment range of the intensity of the white light and the intensity of the excitation light, the intensity ratio of the irradiation lights (white light, excitation light) becomes a constant value.

Also, the range of the irradiation light intensity ratio can be adjusted by the setting of the background/fluorescence ratio 2. The control unit 144 adjusts the intensity at least one of the light sources from among the white light source 20 and the excitation light source 22 on the basis of the background/fluorescence ratio 2 (second ratio) within the adjustment range of the intensity of the white light source 20 (first light source) and the adjustment range of the intensity of the excitation light source 22 (second light source) and adjusts the setting (range of the ratio of the intensity of the irradiation lights) of the irradiation light intensity ratio of the white light source 20 and the excitation light source 22.

For example, the adjustment range of the intensity of the white light and the adjustment range of the intensity of the excitation light both range from 0% to 100%. When the background/fluorescence ratio 2 is set to 1.25 times and the intensity of the white light and the intensity of the excitation light are both within the adjustment range, that is, when the intensity of the white light is controlled to range from 0% to 80% and the intensity of the excitation light is controlled to be in a range from 0% to 100% (1.25 times the intensity of the white light), the irradiation light intensity ratio is the maximum 1.25 times.

Also, in a case where the intensity of the white light is controlled to range from 80% to 100%, the intensity of the excitation light is set to 100% by making it 1.25 times the 80% of the intensity of the white light. Since the intensity of the excitation light can reach the upper limit and the intensity of the excitation light cannot be adjusted to more than 100%, when the intensity of the white light is increased to 80% or greater, the irradiation light intensity ratio is decreased.

Also, in a case where the intensity of the white light and the intensity of the excitation light are both controlled to 100%, the irradiation light intensity ratio is the minimum value of 1 times.

In this manner, when the background/fluorescence ratio 2 is set to 1.25 times, the irradiation light intensity ratio is controlled to be within a range from 1 times to 1.25 times.

Also, for example, by making the additional fluorescence gain G1 times (for example, 1.6 times), the background/fluorescence ratio 2 can be set to 1.25×1.6=2 times while keeping the range of the irradiation light intensity ratio from 1 times to 1.25 times.

For example, the adjustment range of the intensity of the white light ranges from 0% to 40%, the adjustment range of the intensity of the excitation light ranges from 0% to 100%, and the background/fluorescence ratio 2 is set to 2 times. In this example, when the intensity of the white light is controlled to a range from 0% to 40% and the intensity of the excitation light is controlled to a range from 0% to 80% (2 times the intensity of the white light), the irradiation light intensity ratio is the minimum 2 times.

Also, when the intensity of the excitation light is controlled to a range from 80% to 100% and the irradiation light intensity ratio is 2 times, the upper limit of the intensity of the white light is 40%. Thus, by further increasing the intensity of the excitation light above 80%, the irradiation light intensity ratio is increased to greater than 2 times.

In a case where the intensity of the white light is controlled to 40% and the intensity of the excitation light is controlled to 100%, the irradiation light intensity ratio is 2.5 times. In other words, in the adjustment range set for each light source, when the background/fluorescence ratio 2 is set to 2 times, the irradiation light intensity ratio is controlled to be within a range from 2 times to 2.5 times.

In this example also, by making the additional fluorescence gain G2 times (for example, 2 times), the background/fluorescence ratio can be set to 2×2=4 times while keeping the range of the irradiation light intensity ratio from 2 times to 2.5 times.

Note that the settings of the background/fluorescence ratio 2 and the additional fluorescence gain may use a preset default value. In another example, the storage unit 145 configured to store a plurality of settings of the background/fluorescence ratio 2 and the additional fluorescence gain may be provided inside the image processing unit 13, and the background/fluorescence ratio 2 and the additional fluorescence gain may be obtained from the storage unit 145. For example, the additional fluorescence gain adding unit 143 may obtain a predetermined additional fluorescence gain from the storage unit 145 on the basis of a control signal from the temporary fluorescence gain control unit 142.

Note that in the first to third embodiments described above, since a dichroic prism 111 is used, the white light source 20 and the excitation light source 22 are controlled in a time-division manner to obtain the four imaging signals, the red fluorescence and the reflected light of R (red) light, G (green) light, and B (blue) light. However, if a prism is used that can separate the light into the four lights (channels) of R (red) light, G (green) light, B (blue) light, and the fluorescence, each channel can be directly read, meaning that the light sources do not need to be controlled in a time-division manner.

Also, a color filter may be used instead of the prism 111 to obtain the R (red) light, the G (green) light, and the B (blue) light.

Note that in the configurations of the first to third embodiment described above, the image processing unit 13 includes the gain adjustment units 131 and 132. However, the configuration is not limited to this example, and the imaging unit 11 may include the gain adjustment units 131 and 132. Also, the background gain adjustment unit 134 may be disposed in both the imaging unit 11 and the image processing unit 13, allowing the master gain to be adjusted at both. Accordingly, the portion of the master gain that is insufficiently adjusted on the imaging unit 11 side may be adjusted on the image processing unit 13 side.

In a similar manner, the gain adjustment unit 133 may be disposed in both the imaging unit 11 and the image processing unit 13, allowing the gain of the fluorescence imaging signal to be adjusted at both. Accordingly, the portion of the gain of the fluorescence imaging signal that is insufficiently adjusted on the imaging unit 11 side may be adjusted on the image processing unit 13 side.

Note that in the first to third embodiment described above, it is assumed that red fluorescence is generated by blue excitation light, but similar processing can be executed in a case where a plurality of light of other wavelength bands are used.

In the case of executing processing for a plurality of fluorescence (for example, red and green) of a plurality of wavelength bands, regarding red fluorescence, the shutter 112 and the image sensor 116 commonly use the R (red) light, and a function for the R (red) light and the red fluorescence is distributed in a time-division manner. Regarding green fluorescence, the shutter 113 and the image sensor 117 commonly use the G (green) light, and a function for the G (green) light and the green fluorescence is distributed in a time-division manner.

According to the techniques of the disclosure, brightness can be automatically adjusted while suppressing variation in the white balance of a background image in a case where the reflected light of excitation light is mixed in the background image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-088072, filed May 29, 2023, which is hereby incorporated by reference herein in its entirety.

What is claimed is:

1. A processing apparatus comprising:
a first obtaining unit configured to obtain first image information relating to brightness adjustment of a first image obtained from light including light of a first light source and light of a second light source different from the first light source;
a second obtaining unit configured to obtain second image information relating to brightness adjustment of a second image obtained from light of the second light source; and
a control unit configured to control each of intensity of a first irradiation light emitted by the first light source and sensitivity of the first image and intensity of a second irradiation light emitted by the second light source and sensitivity of the second image,
wherein the control unit controls at least one of the intensity of the first irradiation light emitted by the first light source, the sensitivity of the first image, the intensity of the second irradiation light emitted by the second light source, and the sensitivity of the second image on a basis of the first image information and the second image information so that a ratio between the intensity of the first irradiation light and the intensity of the second irradiation light is within a predetermined range.

2. The processing apparatus according to claim 1, wherein the control unit, when controlling the first light source, controls the intensity of the first irradiation light emitted from the first light source using at least one of an amplitude of the first irradiation light, an amount of time the first irradiation light is on, a pulse width of the first irradiation light, and a pulse density of the first irradiation light, and when controlling the second light source, controls the intensity of the second irradiation light emitted from the second light source using at least one of an amplitude of the second irradiation light, an amount of time the second irradiation light is on, a pulse width of the second irradiation light, and a pulse density of the second irradiation light.

3. The processing apparatus according to claim 1, wherein the control unit adjusts the sensitivity of the first image and the sensitivity of the second image using at least one of exposure time of an imaging unit configured to generate an electrical signal by receiving light, gain applied to the electrical signal generated by the imaging unit, and gain applied to an electrical signal used for generating the first image and the second image by an image generation unit.

4. The processing apparatus according to claim 1, wherein the second obtaining unit obtains the second image information as information relating to brightness adjustment of the second image using a second ratio and the first image information,
the first image information is a product of an intensity of the first light source and the sensitivity of the first image,
the second image information is a product of an intensity of the second light source and the sensitivity of the second image, and
the second ratio is a ratio between the first image information and the second image information.

5. The processing apparatus according to claim 4, wherein the second obtaining unit obtains a first setting for adjusting the second ratio,
the control unit obtains a second setting for adjusting an additional gain for the sensitivity of the second image,
the second obtaining unit obtains the second image information using the first image information and the second ratio adjusted by the first setting,
the control unit controls the intensity of the first irradiation light and the sensitivity of the first image on a basis of the first image information,
the control unit controls the intensity of the second irradiation light and the sensitivity of the second image on a basis of the second image information, and
the control unit further adds an additional gain adjusted by the second setting to the sensitivity of the second image.

6. The processing apparatus according to claim 1, wherein the control unit can adjust at least one light source from among the first light source and the second light source within an adjustment range of the intensity of the first irradiation light and the intensity of the second irradiation light and can adjust a range of the ratio between the intensity of the first irradiation light and the intensity of the second irradiation light.

7. The processing apparatus according to claim 1, wherein the second obtaining unit obtains second image information relating to brightness adjustment of the second image on a basis of a comparison between evaluation information of a brightness of the second image obtained using an imaging signal of an imaging unit configured to capture the second image and target information.

8. The processing apparatus according to claim 7, further comprising:
a white balance adjustment unit configured to adjust white balance of a plurality of imaging signals obtained by an imaging unit configured to capture the first image;
a first image gain adjustment unit configured to adjust gain of the plurality of imaging signals for the first image using the plurality of imaging signals with the white balance adjusted and a control signal obtained from the control unit;

a first evaluation information obtaining unit configured to obtain evaluation information of brightness of the first image using the plurality of imaging signals with the gain adjusted for the first image; and a second image gain adjustment unit configured to adjust gain of an imaging signal obtained by the imaging unit on a basis of light of the second light source, wherein the first obtaining unit obtains the first image information as information relating to brightness adjustment of the first image by comparing the evaluation information and preset target information.

9. The processing apparatus according to claim 8, further comprising:

a first image generation unit configured to generate the first image on a basis of the plurality of imaging signals with the gain adjusted by the first image gain adjustment unit;

a second image generation unit configured to generate the second image on a basis of the imaging signals with the gain adjusted by the second image gain adjustment unit; and an image combining unit configured to output an image signal of a combined image of the first image and the second image combined.

10. The processing apparatus according to claim 1, wherein the control unit controls at least one of the first light source and the second light source, within an adjustment range of the first light source and an adjustment range of the second light source, to make a ratio between the intensity of the first irradiation light emitted from the first light source and the intensity of the second irradiation light emitted from the second light source a set irradiation light intensity ratio.

11. The processing apparatus according to claim 10, wherein the control unit controls the intensity of the second irradiation light to a maximum in a case where the intensity of the first irradiation light is a maximum when the ratio between the intensity of the first irradiation light and the intensity of the second irradiation light is controlled to be the intensity ratio within the adjustment range of the first light source and the adjustment range of the second light source.

12. The processing apparatus according to claim 11, wherein the control unit controls the intensity of the first irradiation light to not exceed the adjustment range of the intensity of the second irradiation light on the basis of the set irradiation light intensity ratio and the adjustment range of the first light source and the adjustment range of the second light source.

13. The processing apparatus according to claim 1, wherein the first light source is a light source for observing reflected light from an object, and the second light source is a light source for observing fluorescence emitted from a fluorescent material in the object.

14. The processing apparatus according to claim 1, wherein the control unit includes a first operation mode for keeping the ratio between the intensity of the first irradiation light and the intensity of the second irradiation light within the predetermined range and a second operation mode in which a range for the ratio between the intensity of the first irradiation light and the intensity of the second irradiation light is broader than in the first operation mode, and the first operation mode and the second operation mode can be switched therebetween.

15. The processing apparatus according to claim 1, further comprising:

a third light source different from the first light source and the second light source, wherein the control unit controls at least one of the intensity of the first irradiation light, the sensitivity of the first image, the intensity of the second irradiation light, and the sensitivity of the second image on a basis of the first image information and the second image information to make the ratio within the predetermined range, and controls at least one of the intensity of the first irradiation light, the sensitivity of the first image, intensity of third irradiation light emitted by the third light source, and sensitivity of a third image obtained from the third light source on the basis of the first image information and third image information relating to brightness adjustment of the third image to make a ratio between the intensity of the first irradiation light and the intensity of the third irradiation light within a predetermined range.

16. The processing apparatus according to claim 1, wherein the control unit prioritizes controlling the intensity of the second irradiation light over the sensitivity of the second image when controlling the intensity of the first irradiation light, prioritizes controlling the sensitivity of the second image over the intensity of the second irradiation light when controlling the sensitivity of the first image, prioritizes controlling the intensity of the first irradiation light over the sensitivity of the first image when controlling the intensity of the second irradiation light, and prioritizes controlling the sensitivity of the first image over the intensity of the first irradiation light when controlling the sensitivity of the second image.

17. A processing system comprising:

the processing apparatus according to claim 1;

a display apparatus including a display control unit configured to perform display control to display an image of the second image superimposed on the first image on a display unit on a basis of an image signal output from the processing apparatus; and a light source including the first light source and the second light source, with intensity of light being adjustable on a basis of a control signal output from the processing apparatus.

18. A processing method comprising:

obtaining first image information relating to brightness adjustment of a first image obtained from light including light of a first light source and light of a second light source different from the first light source;

obtaining second image information relating to brightness adjustment of a second image obtained from light of the second light source; and controlling each of intensity of a first irradiation light emitted by the first light source and sensitivity of the first image and intensity of a second irradiation light emitted by the second light source and sensitivity of the second image, wherein in the controlling, at least one of the intensity of the first irradiation light emitted by the first light source, the sensitivity of the first image, the intensity of the second irradiation light emitted by the second light source, and the sensitivity of the second image is controlled on a basis of the first image information and the second image information so that a ratio between the intensity of the first irradiation light and the intensity of the second irradiation light is within a predetermined range.

19. A non-transitory storage medium in which is stored a program that causes a computer to execute the processing method according to claim 18.

* * * * *